(12) United States Patent
Otani et al.

(10) Patent No.: US 11,326,772 B2
(45) Date of Patent: May 10, 2022

(54) BOILER WITH A HEAT GENERATION BODY THAT STORES HYDROGEN

(71) Applicants: MIURA CO., LTD., Matsuyama (JP); Clean Planet Inc., Tokyo (JP)

(72) Inventors: Kazuyuki Otani, Matsuyama (JP); Kenichi Katakawa, Matsuyama (JP)

(73) Assignees: MIURA CO., LTD., Matsuyama (JP); Clean Planet Inc., Tokyo (JP)

( * ) Notice: Subject to any disclaimer, the term of this patent is extended or adjusted under 35 U.S.C. 154(b) by 0 days.

(21) Appl. No.: 17/179,850

(22) Filed: Feb. 19, 2021

(65) Prior Publication Data
US 2021/0285634 A1 Sep. 16, 2021

(30) Foreign Application Priority Data
Mar. 16, 2020 (JP) .............................. JP2020-045129

(51) Int. Cl.
*F22B 1/18* (2006.01)
*F22B 1/28* (2006.01)
*F22B 1/20* (2006.01)
*F22B 35/08* (2006.01)
*F24V 30/00* (2018.01)
(Continued)

(52) U.S. Cl.
CPC .............. *F22B 1/18* (2013.01); *C01B 3/0005* (2013.01); *F22B 1/20* (2013.01); *F22B 1/28* (2013.01); *F22B 3/02* (2013.01); *F22B 35/08* (2013.01); *F24V 30/00* (2018.05); *C01B 3/0026* (2013.01); *Y02E 60/32* (2013.01)

(58) Field of Classification Search
CPC ........... H01M 8/04388; H01M 8/04462; F22B 35/08; F24V 30/00; C01B 3/00; C01B 3/0026; Y02E 60/32; F23N 2005/185; F24H 9/2035
See application file for complete search history.

(56) References Cited

U.S. PATENT DOCUMENTS 3,452,722 A * 7/1969 Konrad ................. F22B 35/083
    122/448.1
9,182,365 B2 11/2015 Kidwell
(Continued)

FOREIGN PATENT DOCUMENTS

| JP | 6-257864 A | 9/1994 |
| JP | 11-72200 A | 3/1999 |
| JP | 2003-286001 A | 10/2003 |

(Continued)

*Primary Examiner* — Edelmira Bosques
*Assistant Examiner* — Michael James Giordano
(74) *Attorney, Agent, or Firm* — Ken (57) ABSTRACT

Provided is a boiler configured to perform heating by a heat generation section provided with heat generation bodies in a container and capable of properly charging a circulation path including, as part thereof, the inside of the container with required gas.

A boiler includes: heat generation bodies; a container configured such that the heat generation bodies are provided inside and configured chargeable with gas with higher specific heat than that of air; and a circulation path including, as part thereof, the inside of the container, the circulation path being a path in which gas circulates. When the charging process of charging the circulation path with the gas is performed, a circulation amount and a gas concentration in the circulation path are monitored.

7 Claims, 7 Drawing Sheets

(51) Int. Cl.
F22B 3/02 (2006.01)
C01B 3/00 (2006.01)

(56) References Cited

U.S. PATENT DOCUMENTS

2010/0304260 A1* 12/2010 Yonekura .......... H01M 8/04328
  429/434
2019/0257551 A1* 8/2019 Iwamura ................... C01B 4/00

FOREIGN PATENT DOCUMENTS

| JP | 2006-218348 A | 8/2006 | |
|---|---|---|---|
| JP | 6149996 B2 | 6/2017 | |
| JP | 6448074 B | 4/2018 | |
| WO | WO-2005118137 A1 * | 12/2005 | .......... B01D 53/864 |
| WO | 2020/021638 A1 | 1/2020 | |

* cited by examiner

BOILER WITH A HEAT GENERATION BODY THAT STORES HYDROGEN

BACKGROUND

1. Technical Field

The present invention relates to a boiler.

2. Description of the Related Art

Typically, a boiler has been broadly utilized for various purposes including industrial and commercial purposes. In the boiler, a heat generation section configured to perform heating is provided in the boiler, and as one form of the heat generation section, there is one provided with a heat generation body in a container.

There are various specific forms of the heat generation section, and as one example thereof, one including, in a container, a heat generation body (a reactant) configured such that multiple metal nanoparticles made of hydrogen storing metal or hydrogen storing alloy are formed on a surface has been disclosed as a heat generation system in Japanese Patent No. 6448074. According to Japanese Patent No. 6448074, it has been described that in the heat generation system, hydrogen-based gas contributing to heat generation is supplied into the container to store hydrogen atoms in the metal nanoparticles and excess heat is generated.

Note that as also described in Japanese Patent No. 6448074, an announcement that the heat generation body produced from palladium is provided in the container and heat generation reaction is made by heating the inside of the container while heavy hydrogen gas is being supplied into the container has been released. Moreover, regarding a heat generation phenomenon that the excess heat (an output enthalpy higher than an input enthalpy) is generated utilizing the hydrogen storing metal or the hydrogen storing alloy, details of the mechanism for generating the excess heat have been discussed among researchers of each country, and it has been reported that the heat generation phenomenon had occurred.

SUMMARY

In the boiler configured to perform heating by the heat generation section provided with the heat generation body in the container, it may be effective for, e.g., the purpose of accelerating gas motion in the container to accelerate heat transfer that a circulation path including, as part thereof, the inside of the container is charged with gas and gas circulation is generated. Specifically, in a case where the above-described reactant is employed as the heat generation body, it is important to charge the circulation path with hydrogen-based gas and generate hydrogen-based gas circulation, considering acceleration of the reaction for generating the excess heat.

The process of charging the circulation path with required gas (the hydrogen-based gas in the above-described example) includes, for example, the process of opening a gas release valve provided on the circulation path to supply the required gas to the circulation path while the gas in the circulation path is circulating. By such a process, the gas present in the circulation path can be gradually replaced with the required gas, and the circulation path can be charged with the required gas.

In the case of performing such a process, it is necessary to monitor the degree of charging of the circulation path with the required gas and continue such a process until the circulation path is moderately charged. However, if there is a problem in monitoring, it is difficult to properly charge the gas. For example, if the above-described process is terminated at such a stage that a required gas supply is still insufficient, such gas cannot be moderately charged. On the other hand, if the process is continued until the supply become excess, there is a probability that such a supply is useless and boiler start-up time increases beyond necessity.

In light of the above-described problems, an object of the present invention is to provide a boiler configured to perform heating by a heat generation section provided with heat generation bodies in a container and capable of properly charging a circulation path including, as part thereof, the inside of the container with required gas.

The boiler according to the present invention is a boiler including a heat generation body, a container configured such that the heat generation body is provided inside and configured chargeable with gas with higher specific heat than that of air, and a circulation path including, as part thereof, the inside of the container and provided as a path in which gas circulates. When a controller (a control section) performs the charging process of charging the circulation path with the gas, a circulation amount and a gas concentration in the circulation path are monitored.

According to the present configuration, heating can be performed by the heat generation section provided with the heat generation body in the container, and the circulation path including, as part thereof, the inside of the container can be properly charged with the required gas. Note that the "circulation amount" as described herein indicates the flow rate of gas (a gas mixture of multiple types of gas in a case where these multiple types of gas are mixed) circulating in the circulation path.

More specifically, in the above-described configuration, a device configured to perform gas discharging from the circulation path may be provided, and as the charging process, a gas supply to the circulation path may be performed while the gas discharging is being performed. The controller may be configured to stop the gas discharging when the circulation amount and the concentration satisfy predetermined conditions. Note that the "device configured to perform gas discharging" may be equivalent to, e.g., a gas release valve or a vacuum pump.

More specifically, in the above-described configuration, the controller may be configured to monitor the circulation amount based on a pressure difference between a downstream side and an upstream side of the heat generation body on the circulation path or a gas flowmeter provided on the circulation path.

More specifically, in the above-described configuration, the gas may be hydrogen-based gas, and the heat generation body may be a reactant configured such that a metal nanoparticle made of hydrogen storing metals is provided on a surface of the reactant and the metal nanoparticle stores a hydrogen atom to generate excess heat. Note that the hydrogen-based gas in the present application is heavy hydrogen gas, light hydrogen gas, or a gas mixture thereof. Moreover, the "hydrogen storing metals" in the present application mean hydrogen storing metal such as Pd, Ni, Pt, or Ti or hydrogen storing alloy containing one or more types of these metals.

More specifically, in the above-described configuration, the controller may be configured to charge the circulation path with purge gas in advance of execution of the charging process. According to the present configuration, the hydrogen-based gas can be safely supplied into the circulation path.

More specifically, in the above-described configuration, the controller may be configured to control, after execution of the charging process, a heat generation amount of the heat generation body based on the pressure of steam supplied to the outside.

The boiler according to the present invention performs heating by the heat generation section provided with the heat generation body in the container so that the circulation path including, as part thereof, the inside of the container can be properly charged with the required gas.

DESCRIPTION OF THE EMBODIMENTS

Hereinafter, a boiler according to each embodiment of the present invention will be described with reference to each drawing.

1. First Embodiment

Figure 1:
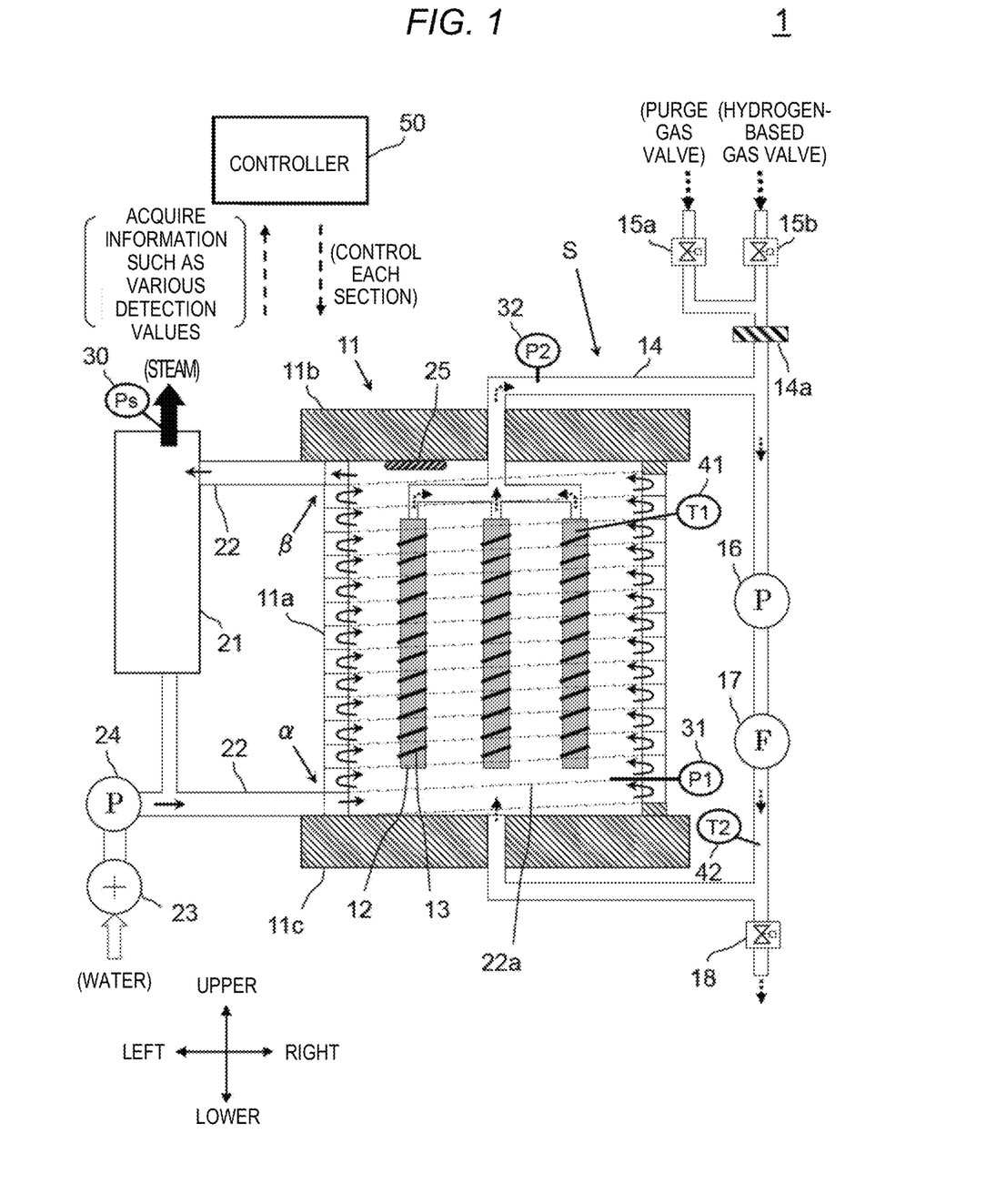
FIG. 1 is a schematic configuration diagram of a boiler 1 according to a first embodiment.

First, a first embodiment of the present invention will be described. FIG. 1 is a schematic configuration diagram of a boiler 1 according to the first embodiment. As illustrated in this figure, the boiler 1 includes a container 11, reactants 12, heaters 13, a gas path 14, a flame arrester 14a, a purge gas valve 15a, a hydrogen-based gas valve 15b, a gas pump 16, a gas filter 17, a gas release valve 18, and a controller 50. Moreover, in the boiler 1, a separator pressure sensor 30, a first pressure sensor 31, and a second pressure sensor 32 are provided as sensors configured to sense pressures, and first temperature sensors 41 and a second temperature sensor 42 are provided as sensors configured to sense temperatures.

Note that the states of the container 11 and the inside thereof in FIG. 1 (the same also applies to FIGS. 5, 6, and 7 as described later) are illustrated as schematic sectional views along a plane cutting the container 11 substantially in half, and upper, lower, right, and left directions (an upper-lower direction is coincident with the vertical direction) are as illustrated in this figure. Moreover, chain lines illustrated in FIG. 1 (the same also applies to FIGS. 5, 6, and 7) schematically indicate arrangement of a heat transfer pipe 22a.

The container 11 is, as a whole, formed in a cylindrical shape having bottoms at both upper and lower ends in the upper-lower direction as an axial direction, and is formed so that gas can be sealed inside. More specifically, the container 11 has a cylindrical side wall 11a formed by the later-described heat transfer pipe 22a, and the upper side of the side wall 11a is closed by an upper bottom portion 11b and the lower side of the side wall 11a is closed by a lower bottom portion 11c. Note that in the present embodiment, the side wall 11a of the container 11 is in the cylindrical shape as one example, but may be formed in other tubular shapes. Alternatively, a can body cover may be placed at the outer periphery of the side wall 11a, and a heat insulating member may be provided between the side wall 11a and the can body cover.

The reactant 12 is configured such that many metal nanoparticles are provided on a surface of a carrier formed in a fine mesh shape as a whole. Hydrogen storing alloys (hydrogen storing metal or hydrogen storing alloy) are applied as the material of this carrier, and the carrier is formed in a cylindrical shape having bottoms at both upper and lower ends along the upper-lower direction as the axial direction. An upper surface of the reactant 12 is connected to the gas path 14 so that gas having flowed into the reactant 12 through mesh-shaped clearances thereof can be delivered into the gas path 14.

In the example of the present embodiment, three reactants 12 are arranged next to each other in the right-left direction in the container 11. Note that the above-described carrier is formed in the mesh shape, and therefore, the reactant 12 has many holes (the mesh-shaped clearances in the example of the present embodiment) through which gas can penetrate.

The heater 13 is spirally wound around a side surface of the reactant 12 formed in the bottomed cylindrical shape, and is formed to generate heat by using supplied power. For example, a ceramic heater may be employed as the heater 13. The heater 13 generates heat to heat the reactant 12 so that the temperature of the reactant 12 can be increased to a predetermined reaction temperature at which later-described reaction for generating excess heat is easily made. Note that the controller 50 controls a power supply to the heater 13 so that the temperature of the heater 13 can be adjusted.

The control of the power supply to the heater 13 by the controller 50 may be performed such that the temperature of the heater 13 approaches a target value. For example, the controller 50 may detect the temperature of the heater 13, and may increase the power supply to the heater 13 in a case where such a detection value is lower than the target value and may decrease the power supply to the heater 13 in a case where the detection value is higher than the target value.

The gas path 14 is provided outside the container 11, and forms a gas circulation path (hereinafter referred to as a "circulation path S") including, as part thereof, the inside of the container 11. One end portion of the gas path 14 is connected to the upper surface of each reactant 12, and the other end portion is connected to the inside of the container 11. More specifically, portions of the gas path 14 connected to the upper surfaces of the reactants 12 are joined together in the container 11, and after having penetrated the upper bottom portion 11b as a single path, further penetrate the lower bottom portion 11c sequentially through the gas pump 16 and the gas filter 17 and are connected to the inside of the container 11.

For example, the rotational speed of the gas pump 16 is controlled by inverter control, and with a flow rate according to this rotational speed, gas in the gas path 14 flows from an upstream side to a downstream side (i.e., in a direction indicated by dashed arrows in FIG. 1). Note that the controller 50 controls the rotational speed of the gas pump 16 so that a gas circulation amount (a circulating gas flow rate) in the circulation path S can be adjusted.

This rotational speed control by the controller 50 may be performed such that the gas circulation amount in the circulation path S approaches a target value. For example, the controller 50 may detect the circulation amount, and may increase the rotational speed of the gas pump 16 to increase the circulation amount in a case where such a detection value is lower than the target value and may decrease the rotational speed of the gas pump 16 to decrease the circulation amount in a case where the detection value is higher than the target value.

The gas filter 17 removes an impurity (specifically, one as a cause for interference with the reaction for generating the excess heat in the reactant 12) contained in gas in the gas path 14. A separator 21 receives steam generated by heating of water through the heat transfer pipe 22$a$, and performs steam separation (separation of drain contained in such steam) for the steam. The steam separated in the separator 21 can be supplied to the outside of the boiler 1.

A water path 22 is a water path connected from a water receiving portion 23 to the separator 21. Part of the water path 22 is the heat transfer pipe 22$a$ forming the side wall 11$a$ as described above. Moreover, in the middle of the water path 22, a water pump 24 is arranged at a position immediately on the downstream side of the water receiving portion 23. Note that liquid water supplied from the water receiving portion 23 flows in an upstream-side path of the water path 22 with respect to the heat transfer pipe 22$a$, and water (steam) evaporated by heating in the heat transfer pipe 22$a$ flows in a downstream-side path (between the container 11 and the separator 21) with respect to the heat transfer pipe 22$a$.

The water receiving portion 23 receives, as necessary, a supply of water as a steam source from the outside, and causes the supplied water to flow into the water path 22. The water pump 24 causes water in the water path 22 to flow from the upstream side to the downstream side (i.e., in a direction indicated by solid arrows in FIG. 1).

The heat transfer pipe 22$a$ spirally extends from the lower bottom portion 11$c$ to the upper bottom portion lib to form the tubular side wall 11$a$ of the container 11. That is, the heat transfer pipe 22$a$ spirally extends in the axial direction (the upper-lower direction) of the tubular side wall 11$a$ such that no clearance is formed between adjacent portions of the heat transfer pipe 22$a$ in the upper-lower direction. Note that in the example of the present embodiment, the sectional shape of an inner wall of the heat transfer pipe 22$a$ is in a rectangular shape, but may be a circular shape or other shapes.

A sensor 25 can sense the presence or absence of a risk factor such as flame or an ignition source in the container 11, and can sense the concentrations of various types of gas (at least purge gas and hydrogen-based gas) in the container 11.

The purge gas valve 15$a$ and the hydrogen-based gas valve 15$b$ are connected in parallel through the flame arrester 14$a$ at predetermined positions (downstream positions with respect to the second pressure sensor 32) on the upstream side of the gas pump 16 on the gas path 14. In the example illustrated in FIG. 1, one purge gas valve 15$a$ and one hydrogen-based gas valve 15$b$ are arranged, but for, e.g., improvement of safety, multiple purge gas valves 15$a$ and multiple hydrogen-based gas valves 15$b$ may be arranged in series. The purge gas (nitrogen in the example of the present embodiment) is supplied from an external supply source to the upstream side of the purge gas valve 15$a$. For example, in a case where the purge gas is supplied from a tank having stored the purge gas in advance, such a tank is the purge gas supply source.

Meanwhile, the hydrogen-based gas (heavy hydrogen gas, light hydrogen gas, or a gas mixture thereof) is supplied from an external supply source to the upstream side of the hydrogen-based gas valve 15$b$. For example, in a case where the hydrogen-based gas is supplied from a tank having stored the hydrogen-based gas in advance, such a tank is the hydrogen-based gas supply source.

Opening and closing of the purge gas valve 15$a$ and the hydrogen-based gas valve 15$b$ are controlled by the controller 50. When the purge gas valve 15$a$ is in an open state, the purge gas is supplied to the gas path 14 through the purge gas valve 15$a$ and the flame arrester 14$a$. When the purge gas valve 15$a$ is in a closed state, no purge gas is supplied. When the hydrogen-based gas valve 15$b$ is in an open state, the hydrogen-based gas is supplied to the gas path 14 through the hydrogen-based gas valve 15$b$ and the flame arrester 14$a$. When the hydrogen-based gas valve 15$b$ is in a closed state, no hydrogen-based gas is supplied.

The gas release valve 18 is connected to a predetermined position on the downstream side of the gas filter 17 on the gas path 14. Opening and closing of the gas release valve 18 are controlled by the controller 50. When the gas release valve 18 is in an open state, gas in the gas path 14 is discharged. When the gas release valve 18 is in a closed state, such discharging is stopped. Note that in a case where the internal pressure of the gas path 14 is lower than an atmospheric pressure, a vacuum pump or a vacuum valve may be applied instead of the gas release valve 18. The gas release valve, the vacuum pump, and the vacuum valve are one example of a device capable of discharging gas from the circulation path S.

The separator pressure sensor 30 is a sensor configured to detect a pressure in the separator 21, and in a situation where steam has been generated, the pressure (hereinafter referred to as a "steam pressure") of the steam supplied from the separator 21 to the outside is continuously detected. Note that a detection value (a steam pressure value) of the separator pressure sensor 30 is high in a situation where the amount of steam supplied from the boiler 1 is greater than the amount (a steam load) of steam required from the outside, and on the other hand, is low in a situation where the amount of steam supplied from the boiler 1 is smaller.

The first pressure sensor 31 is a sensor configured to detect the internal pressure of the container 11, and the second pressure sensor 32 is a sensor configured to detect the internal pressure of the gas path 14 at a predetermined position (a position on the upstream side with respect to the gas pump 16). Note that in subsequent description, a pressure value detected by the separator pressure sensor 30 will be sometimes referred to as a "pressure Ps," a pressure value detected by the first pressure sensor 31 will be sometimes referred to as a "pressure P1," and a pressure value detected by the second pressure sensor 32 will be sometimes referred to as a "pressure P2." Moreover, the first temperature sensor 41 is arranged to detect the temperature of the reactant 12, and the second temperature sensor 42 is arranged to detect the internal temperature of the gas path 14. Such pressure and temperature detection information is transmitted to the controller 50.

The controller 50 includes an arithmetic processing device and the like, and acquires information such as various detection values to properly control each section of the boiler 1 based on such information. Specific contents of the control by the controller 50 will be apparent from description below.

Next, regarding main processes of the boiler 1, a normal operation process, an operation start process, and an operation stop process will be separately sequentially described.

<Normal Operation Process>

First, the normal operation process of the boiler 1 will be described. Note that at the start of normal operation, the later-described operation start process has been executed in advance, and a state in which the circulation path S is charged with the hydrogen-based gas and a moderate amount of water is supplied to the water path 22 has been brought.

The controller 50 drives the gas pump 16 such that the hydrogen-based gas with which the circulation path S is charged circulates in the direction indicated by the dashed arrows in FIG. 1. At this point, in the container 11, the hydrogen-based gas flows into the reactants 12 through the mesh-shaped clearances (many holes) thereof, and thereafter, is delivered into the gas path 14 connected to upper portions of the reactants 12.

At the same time, the controller 50 drives the heaters 13 to heat the reactants 12. When the reactants 12 are heated by the heaters 13 in a state in which the hydrogen-based gas has been supplied into the container 11, the metal nanoparticles provided on the reactants 12 store hydrogen atoms, and the reactants 12 generate an excess heat of equal to or higher than the temperature of heating by the heater 13. As described above, since the reactant 12 makes the reaction for generating the excess heat, the reactant 12 functions as a heat generation body. The principle of the reaction for generating the excess heat is, for example, similar to the principle of reaction for generating excess heat as disclosed in Japanese Patent No. 6448074.

From the hydrogen-based gas in the circulation path S, the impurity is removed when the hydrogen-based gas passes through the gas filter 17. Thus, the high-purity hydrogen-based gas from which the impurity has been removed is continuously supplied into the container 11. With this configuration, the high-purity hydrogen-based gas can be stably provided to the reactants 12, a state in which the output of the excess heat is easily induced can be maintained, and the reactants 12 can effectively generate heat.

In parallel with the process of generating heat by the reactants 12 as described above, the controller 50 drives the water pump 24 such that water in the water path 22 flows in the direction indicated by the solid arrows in FIG. 1. When passing through the heat transfer pipe 22a forming the side wall 11a of the container 11, the water flowing in the water path 22 is heated by heat generated by the reactants 12. That is, the heat generated by the reactants 12 is transmitted to the heat transfer pipe 22a by convection (heat transfer), heat conduction, and radiation by the hydrogen-based gas in the container 11, and the heat transfer pipe 22a of which temperature has been increased to a higher temperature by such transmission heats the water flowing in the heat transfer pipe 22a.

Figure 2:
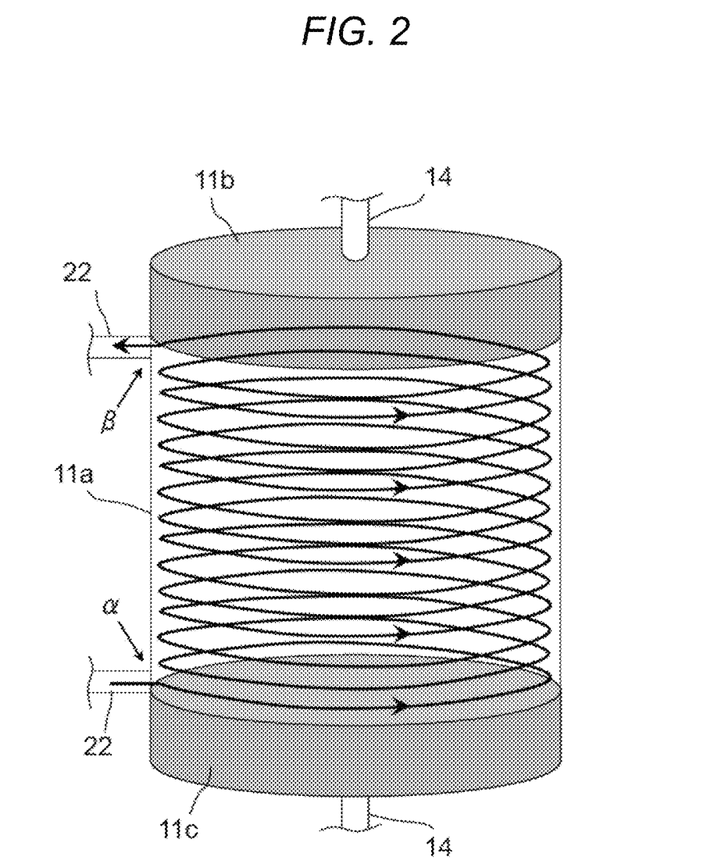
FIG. 2 is a view for describing the course of water passing through a heat transfer pipe of the boiler 1.

FIG. 2 schematically illustrates the course of water passing through the heat transfer pipe 22a by a solid arrow. As illustrated in this figure, water having entered the heat transfer pipe 22a through an inlet α (the lowermost portion of the heat transfer pipe 22a) of the heat transfer pipe 22a flows along a spirally-extending path in the heat transfer pipe 22a, and is discharged as steam toward the separator 21 through an outlet β (the uppermost portion of the heat transfer pipe 22a) of the heat transfer pipe 22a. At this point, heat from the heat transfer pipe 22a (the side wall 11a of the container 11) heated by heat generated by the reactants 12 is transmitted to the water passing through the heat transfer pipe 22a, and the temperature of the water increases.

In this manner, the water flowing in the water path 22 is heated when passing through the heat transfer pipe 22a, and the temperature thereof increases. Eventually, the water turns into steam. Such steam is delivered into the separator 21, and after the dryness of the steam has been increased by steam separation, is supplied to the outside of the boiler 1.

The amount of steam supplied from the separator 21 to the outside can be, for example, adjusted according to the amount of steam required from the outside. Moreover, the controller 50 sequentially supplies water to the water receiving portion 23 by an amount corresponding to a steam supply to the outside, i.e., a water decrement. Accordingly, the boiler 1 can continuously generate steam to supply the steam to the outside.

A heat generation amount of the reactant 12 as described herein varies according to the temperature of the heater 13 and the hydrogen-based gas circulation amount. That is, as the temperature of the heater 13 increases, the reaction for generating the excess heat in the reactant 12 is more accelerated, and the heat generation amount of the reactant 12 increases. Moreover, as the hydrogen-based gas circulation amount increases, more hydrogen-based gas in the container 11 acts on the reactant 12, the reaction for generating the excess heat is more accelerated, and the heat generation amount of the reactant 12 increases. Further, as the heat generation amount of the reactant 12 increases, heating of water in the heat transfer pipe 22a is more accelerated to generate more steam, and the steam pressure increases.

Utilizing this situation, the controller 50 controls the heat generation amount of the reactant 12 such that a proper steam pressure is provided (the pressure Ps falls within a preset proper range). More specifically, the controller 50 continuously acquires information on the pressure Ps (the steam pressure detection value), and monitors whether or not such a detection value falls within the proper range. This proper range is preferably properly set in advance according to, e.g., the specifications of the boiler 1 and the steam load.

In a case where the detection value exceeds the proper range, the controller 50 adjusts the temperature of the heater 13 to decrease, and adjusts the hydrogen-based gas circulation amount to decrease. By execution of such adjustment, the heat generation amount of the reactant 12 decreases, and the steam pressure decreases and approaches the proper range. On the other hand, in a case where the detection value falls below the proper range, the controller 50 adjusts the temperature of the heater 13 to increase, and adjusts the hydrogen-based gas circulation amount to increase. By execution of such adjustment, the heat generation amount of the reactant 12 increases, and the steam pressure increases and approaches the proper range. By such feedback control, the steam pressure can be maintained within the proper range.

Note that adjustment of the temperature of the heater 13 can be implemented in such a manner that the power supply to the heater 13 is changed as necessary. Moreover, adjustment of the hydrogen-based gas circulation amount can be implemented in such a manner that the rotational speed of the gas pump 16 is changed as necessary. As described above, the controller 50 adjusts, according to the pressure Ps, both items of the temperature of the heater 13 and the hydrogen-based gas circulation amount. Thus, both items can be changed with favorable balance, and the heat generation amount of the reactant 12 can be controlled. Note that according to various situations, only either one of the items may be adjusted instead of adjusting both items as described above. As necessary, which one of these items is to be adjusted can be set.

<Operation Start Process>

Figure 3:
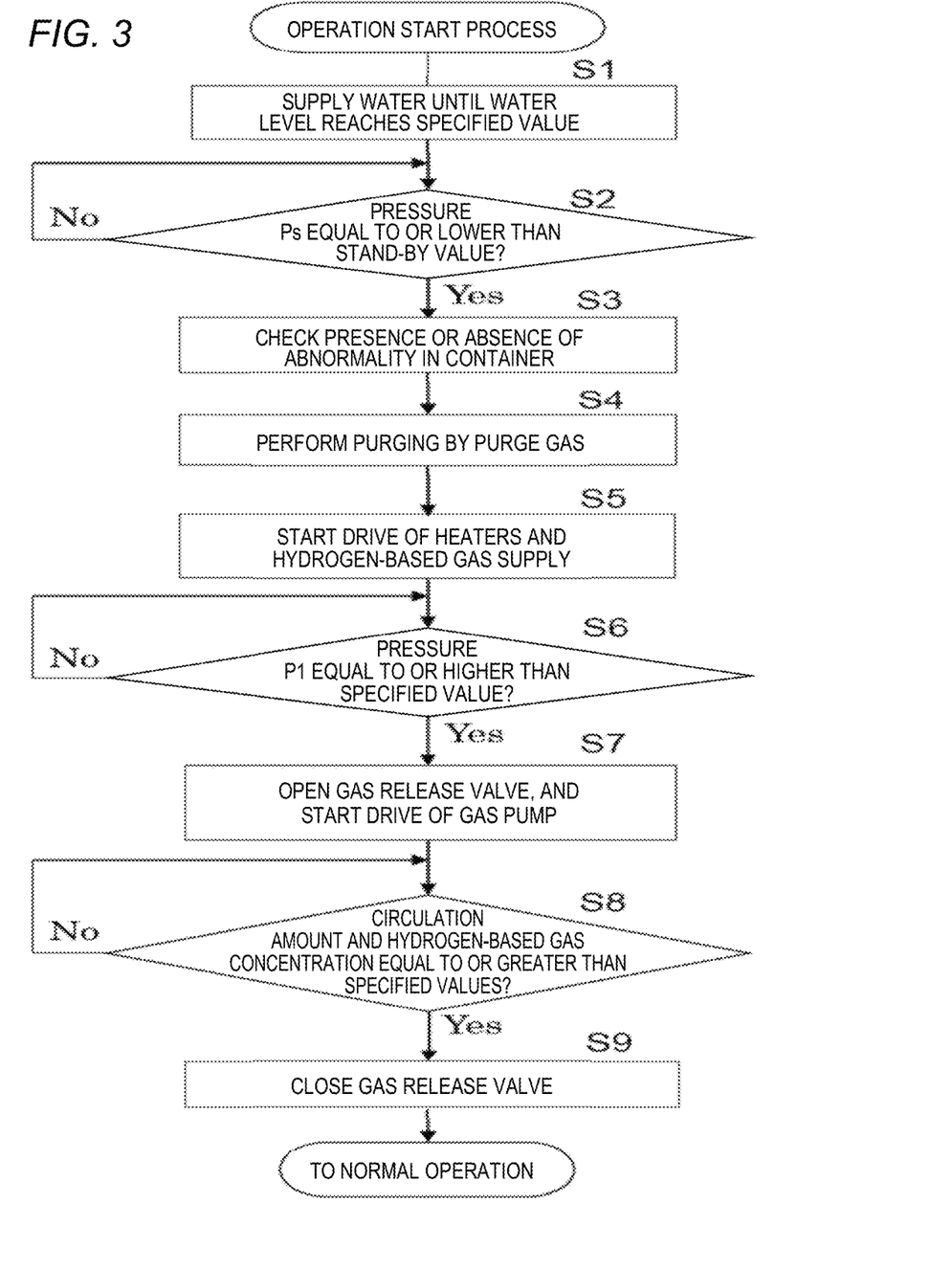
FIG. 3 is a flowchart of an operation start process.

Next, the operation start process of the boiler 1 will be described below with reference to a flowchart illustrated in FIG. 3.

When the operation of starting the boiler 1 (e.g., predetermined switch operation) is performed, the controller 50 supplies water from the outside to the water receiving portion 23, and supplies water to the water path 22 until a water level reaches a specified value (a step S1). In this manner, a moderate amount of water can be supplied to the heat transfer pipe 22a before the heat transfer pipe 22a reaches a high temperature by heat of the reactants 12.

Further, the controller 50 determines whether or not the pressure Ps is equal to or lower than a predetermined stand-by value Z (a step S2). The stand-by value Z is, for example, set to about 0.8 MPa, and the pressure Ps exceeding the stand-by value Z indicates a situation where the steam supply from the boiler 1 to the outside is not necessary and the process for the steam supply needs to wait.

When the pressure Ps is equal to or lower than the stand-by value Z (Yes at the step S2), the controller 50 subsequently checks the presence or absence of an abnormality in the container 11 (a step S3). Note that the presence or absence of the abnormality in the container 11 (the presence or absence of the risk factor such as the flame or the ignition source) is checked based on the information sensed by the sensor 25. In a case where the abnormality has been confirmed, the controller 50 may temporarily stop the operation start process, and may inform the outside (e.g., an operator of the boiler 1) of the presence of the abnormality.

When the abnormality in the container 11 has not been confirmed, the controller 50 subsequently performs purging in the circulation path S by the purge gas (a step S4). Specifically, the controller 50 opens the purge gas valve 15a such that the purge gas is supplied into the gas path 14.

Thereafter, after a lapse of predetermined time from the start of a purge gas supply or when the concentration (the value sensed by the sensor 25) of the purge gas exceeds a specified value, such a situation is taken as purging being sufficiently performed, and the controller 50 closes the purge gas valve 15a. In this manner, purging processing is completed. As described above, the circulation path S is charged with the purge gas in advance of a process at a later-described step S5, and therefore, the hydrogen-based gas can be safely supplied into the circulation path S.

Next, the controller 50 starts driving the heaters 13 and supplying the hydrogen-based gas into the circulation path S (the step S5). More specifically, the controller 50 supplies power to the heaters 13, and opens the hydrogen-based gas valve 15b such that the hydrogen-based gas is supplied into the gas path 14. Note that the power supply to the heaters 13 is performed to such an extent that the heaters 13 are maintained at a predetermined temperature (a temperature at which the safety can be ensured, and a temperature lower than that in the normal operation) until a process at a later-described step S9 is performed.

In parallel with the hydrogen-based gas supply into the circulation path S, the controller 50 monitors whether or not the pressure P1 has reached a specified value (a step S6). In a case where the pressure P1 has reached the specified value, such a situation is taken as a situation where the gas pump 16 can be properly utilized, and the controller 50 opens the gas release valve 18, and starts driving the gas pump 16 (a step S7). Accordingly, gas circulation in the circulation path S is accelerated. As described above, the hydrogen-based gas supply to the circulation path S is performed in a state in which the gas release valve 18 is opened, and therefore, the circulation path S can be charged with the hydrogen-based gas while the purge gas is being gradually discharged through the gas release valve 18. Such a process corresponds to a charging process according to the present invention.

Thereafter, the controller 50 monitors whether or not both of the circulation amount V1 in the circulation path S and the concentration V2 of the hydrogen-based gas in the circulation path S satisfy predetermined reference conditions (a step S8). The circulation amount V1 is a circulation amount of gas (the gas mixture of the hydrogen-based gas and the purge gas in a situation where these types of gas are mixed) in the circulation path S, and the concentration V2 is the concentration of the hydrogen-based gas in the gas in the circulation path S and can be sensed by the sensor 25.

In the present embodiment, when a difference between the pressure P2 and the pressure P1 reaches equal to or greater than a specified value, it is, utilizing the first and second pressure sensors 31, 32, determined that the circulation amount V1 satisfies the reference condition. Note that the difference between the pressure P2 and the pressure P1 is equivalent to a pressure difference between the downstream side (the upstream side with respect to the gas pump 16) and the upstream side (the downstream side with respect to the gas pump 16) of the reactant 12 on the circulation path S. Such a pressure difference is greatly influenced by a pressure loss in many holes of the reactant 12, and increases as the circulation amount in the circulation path S increases.

The pressure difference is closely associated with the circulation amount V1 as described above, and therefore, the circulation amount V1 can be monitored by monitoring of the pressure difference. Note that a gas flowmeter may be placed in the circulation path S to monitor a detection value of the gas flowmeter instead of the difference between the pressure P2 and the pressure P1, thereby monitoring the circulation amount V1. In this case, when the detection value of the gas flowmeter reaches equal to or greater than a specified value, it may be determined that the circulation amount V1 satisfies the reference condition. Note that it is determined that the concentration V2 satisfies the reference condition when the concentration of the hydrogen-based gas sensed by the sensor 25 reaches equal to or higher than a specified value.

As described above, in the present embodiment, both of the circulation amount V1 and the concentration V2 are monitored when the charging process of charging the circulation path S with the hydrogen-based gas is performed. In terms of both of an absolute amount and a percentage, it can be accurately determined whether or not the circulation path S is moderately charged with the hydrogen-based gas, and the hydrogen-based gas can be supplied without excess or deficiency to the extent possible.

When both of the circulation amount V1 and the concentration V2 reach equal to or greater than the specified values (Yes at the step S8), almost no purge gas remains in the circulation path S, such a situation is taken as the hydrogen-based gas being sufficiently charged, and the controller 50 closes the gas release valve 18 (the step S9). As described above, in the present embodiment, the hydrogen-based gas is, as the charging process, supplied to the circulation path S while gas is being discharged from the circulation path S. When the circulation amount V1 and the concentration V2 satisfy the above-described reference conditions, such gas discharging is stopped. Thus, the charging process of charging the circulation path S with the hydrogen-based gas is completed, and thereafter, the normal operation process as already described is performed in the boiler 1.

Note that in the present embodiment, in the process at the step S5, drive of the heaters 13 is also started when the hydrogen-based gas supply into the circulation path S starts. Thus, start-up time of the boiler 1 can be shortened. Note that in a case where it is difficult to ensure the safety due to drive of the heaters 13 upon charging of the hydrogen-based gas or a case where a temperature increase in the reactant 12 by the heater 13 can be sufficiently quickly performed, drive of the heaters 13 may be started after the process at the step S9.

<Operation Stop Process>

The boiler 1 performing the above-described normal operation process is brought into a stop state through the predetermined operation stop process when operation of the boiler 1 is stopped. A situation where operation is stopped includes, for example, a case where the pressure Ps has exceeded the above-described stand-by value Z. Hereinafter, the operation stop process of the boiler 1 will be described with reference to a flowchart illustrated in FIG. 4.

Figure 4:
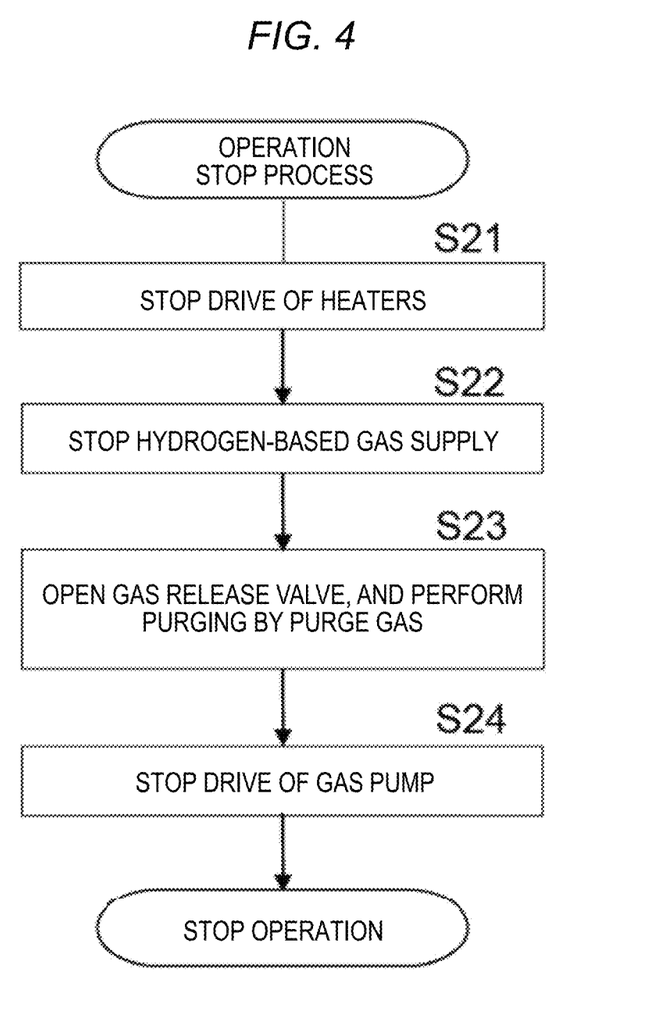
FIG. 4 is a flowchart of an operation stop process.

The controller 50 first stops drive of the heaters 13 (a step S21), and further closes the hydrogen-based gas valve 15b and stops the hydrogen-based gas supply into the gas path 14 (a step S22). Thereafter, the controller 50 opens the gas release valve 18 such that purging in the circulation path S by the purge gas is performed (a step S23). More specifically, the controller 50 opens the purge gas valve 15a such that the purge gas is supplied into the gas path 14. Accordingly, the purge gas supply into the circulation path S and gas discharging through the gas release valve 18 are simultaneously performed, and the hydrogen-based gas present in the circulation path S is gradually replaced with the purge gas.

After a lapse of predetermined time from the start of the purge gas supply or when the concentration (the value sensed by the sensor 25) of the purge gas exceeds the specified value, such a situation is taken as purging being sufficiently performed, and the controller 50 closes the purge gas valve 15a. In this manner, the purging processing is completed. Thereafter, the controller 50 stops drive of the gas pump 16 (a step S24), and accordingly, the boiler 1 is brought into the state in which operation is stopped.

When operation of the boiler 1 is resumed after operation has been stopped, the above-described operation start process may be performed again. Note that at this point, purging in the circulation path S has been finished by the previous operation stop process in the boiler 1, and supplied water remains in the water path 22. Thus, the processes at the step S1 and the step S4 in the operation start process may be omitted.

2. Second Embodiment

Next, a second embodiment of the present invention will be described. Note that the second embodiment is basically similar to the first embodiment, except for the form of a heat generation body and points relating thereto. In description below, description will be made focusing on contents different from those of the first embodiment, and description of contents common to those of the first embodiment might be omitted.

Figure 5:
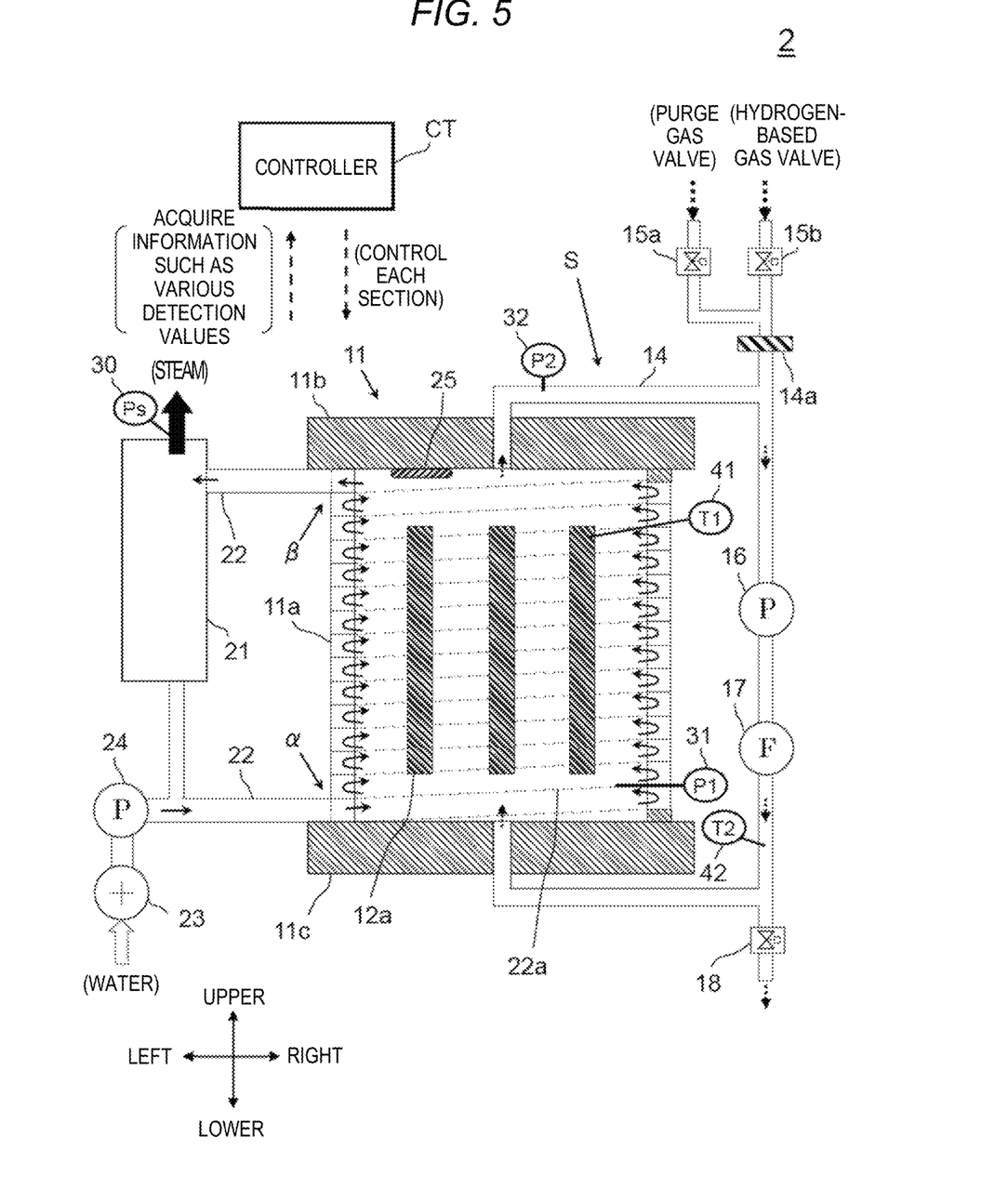
FIG. 5 is a schematic configuration diagram of a boiler 2 according to a second embodiment.

FIG. 5 is a schematic configuration diagram of a boiler 2 in the second embodiment. The reactant 12 is employed as the heat generation body in the boiler 1 of the first embodiment. Instead, a general heat generation element 12a is employed in the second embodiment. Note that the heat generation element 12a described herein is, as one example, a halogen heater configured to generate heat by a power supply. Moreover, for the sake of convenience, the shape and dimensions of the heat generation element 12a are similar to those of the reactant 12. In a case where the heat generation element 12a is applied as the heat generation body, excess heat is not necessarily generated as in the first embodiment, and one equivalent to a heater 13 is not necessary and placement thereof is omitted. Further, an upstream-side end portion of a gas path 14 in the second embodiment is connected to an upper bottom portion 11b instead of the heat generation element 12a, and is connected to a space in a container 11.

In the boiler 2, a heat transfer pipe 22a is heated by heat generated from the heat generation elements 12a instead of the reactants 12, and heat from the heat transfer pipe 22a (a side wall 11a of the container 11) is transmitted to water passing through the heat transfer pipe 22a, and the temperature of the water increases. Moreover, in this form, the above-described reaction for generating the excess heat is not necessary, and the temperature of the heat generation element 12a is directly controlled by power control so that water can be moderately heated to generate steam.

Moreover, in the boiler 2, a controller 50 adjusts the power supply to the heat generation element 12a so that a heat generation amount of the heat generation element 12a (the heat generation body) can be controlled. Thus, the controller 50 in the second embodiment controls the heat generation amount of the heat generation element 12a such that a proper steam pressure is provided. More specifically, the controller 50 continuously acquires information on a pressure Ps (a steam pressure detection value), and monitors whether or not such a detection value falls within a proper range.

In a case where the detection value exceeds the proper range, the controller 50 adjusts the temperature of the heat generation element 12a to decrease. By execution of such adjustment, the heat generation amount of the heat generation element 12a decreases, and the steam pressure decreases and approaches the proper range. On the other hand, in a case where the detection value falls below the proper range, the controller 50 adjusts the temperature of the heat generation element 12a to increase. By execution of such adjustment, the heat generation amount of the heat generation element 12a increases, and the steam pressure increases and approaches the proper range. As described above, the heat generation amount of the heat generation element 12a can be controlled such that the proper steam pressure is provided.

Moreover, in the second embodiment, an operation start process (the steps S1 to S9) and an operation stop process (the steps S21 to S24) equivalent to those of the first embodiment can be also executed. Note that in the second embodiment, drive of the heat generation elements 12a may be started instead of starting drive of the heaters 13 at the step S5, and drive of the heat generation elements 12a may be stopped instead of performing the process at the step S21.

3. Other

The boiler 1, 2 of each embodiment described above includes the heat generation bodies and the container 11 configured such that the heat generation bodies are provided inside, and heats supplied water (one example of fluid) to generate steam. Further, each boiler 1, 2 includes the heat transfer pipe 22a heated by heat generated by the heat generation bodies under environment where the container 11 is charged with gas (the hydrogen-based gas in the examples of the present embodiments) with a higher specific heat at constant pressure than that of air, and water (water as the steam source) passing through the heat transfer pipe 22a is heated. Note that under, e.g., a condition of 1 atm at 200° C., the specific heat of air is about 1,026 J/Kg° C., and on the other hand, the specific heat of hydrogen at constant pressure is about 14,528 J/Kg° C. and is much higher than the specific heat of air at constant pressure. Moreover, as the heat generation body, the reactant 12 is employed in the boiler 1, and the heat generation element 12a is employed in the boiler 2.

According to each boiler 1, 2, water is heated by a heat generation section provided with the heat generation bodies in the container 11 to generate steam, and the heat generated by the heat generation bodies can be efficiently transmitted to the water. As a result, the heat generated by the heat generation bodies can be efficiently transmitted to the water as the steam source.

Further, the container 11 is charged with the gas with the higher specific heat than that of air, and therefore, heat transfer can be favorably performed as compared to the case of charging general air, and heat generated by the heat generation bodies can be efficiently transmitted to water as the steam source. Moreover, due to the high specific heat, it is less likely to fluctuate the temperature of the gas, and heat can be more stably transmitted to water.

Moreover, the heat transfer pipe 22a forms the entire periphery of the side wall 11a formed in the tubular shape, and therefore, heat generated by the heat generation bodies can be efficiently transmitted to water as the steam source. Specifically, the heat transfer pipe 22a in the present embodiments is arranged to surround the heat generation bodies, and therefore, the substantially entire area of the periphery of the side wall 11a can be covered and heat generated by the heat generation bodies can be transmitted to water as the steam source with as least waste as possible. Note that in each of the above-described embodiments, the heat transfer pipe spirally extends and is arranged to surround the heat generation bodies, but the form surrounding the heat generation bodies is not limited to above. For example, a form in which multiple heat transfer pipes extending in the vertical direction are arranged to surround the heat generation bodies may be employed.

Moreover, in each of the above-described embodiments, the side wall 11a for sealing gas in the container 11 is formed by the heat transfer pipe 22a. Instead, the side wall 11a may be provided separately from the heat transfer pipe 22a, and the heat transfer pipe 22a may be provided inside this side wall 11a. In this case, under environment where the container 11 is charged with the gas with the higher specific heat than that of air, the heat transfer pipe 22a can be also heated by heat generated by the heat generation bodies. Moreover, in this case, the heat transfer pipe 22a does not necessarily fulfill a function as the side wall 11a, but preferably fulfills such a function because the heat transfer pipe 22a is more likely to receive heat from the heat generation bodies when the clearance is formed between adjacent portions of the heat transfer pipe 22a in the upper-lower direction.

In each boiler 1, 2, the above-described gas circulates in the circulation path S (the circulation path formed by the inside of the container 11 and the gas path 14). With this configuration, the effect of accelerating gas motion in the container 11 and more effectively performing heat transfer from the gas to the side wall 11a is expected. Note that in the boiler 2, the reaction for generating the excess heat is not necessary, and therefore, gas other than the hydrogen-based gas may be employed as the above-described gas with the higher specific heat than that of air.

Moreover, each boiler 1, 2 includes the controller 50 configured to control the heat generation amount of the heat generation body, and therefore, water can be moderately heated according to various situations. Specifically, in each of the above-described embodiments, the heat generation amount is controlled based on the steam pressure (the pressure of steam supplied to the outside), and therefore, is easily controlled such that the steam pressure is adjusted to a proper value. Note that the control of the heat generation amount of the heat generation body according to the present invention is not limited to the control based on the steam pressure, but may be control based on various other types of information.

Note that in each of the above-described embodiments, water as the steam source flows in the water path 22 including the heat transfer pipe 22a. Instead, a heat medium Y may flow in a heat medium path including a heat transfer pipe so that water as the steam source can be heated using this heat medium Y. A schematic configuration diagram of the boiler configured as described above is illustrated as an example in FIG. 6.

Figure 6:
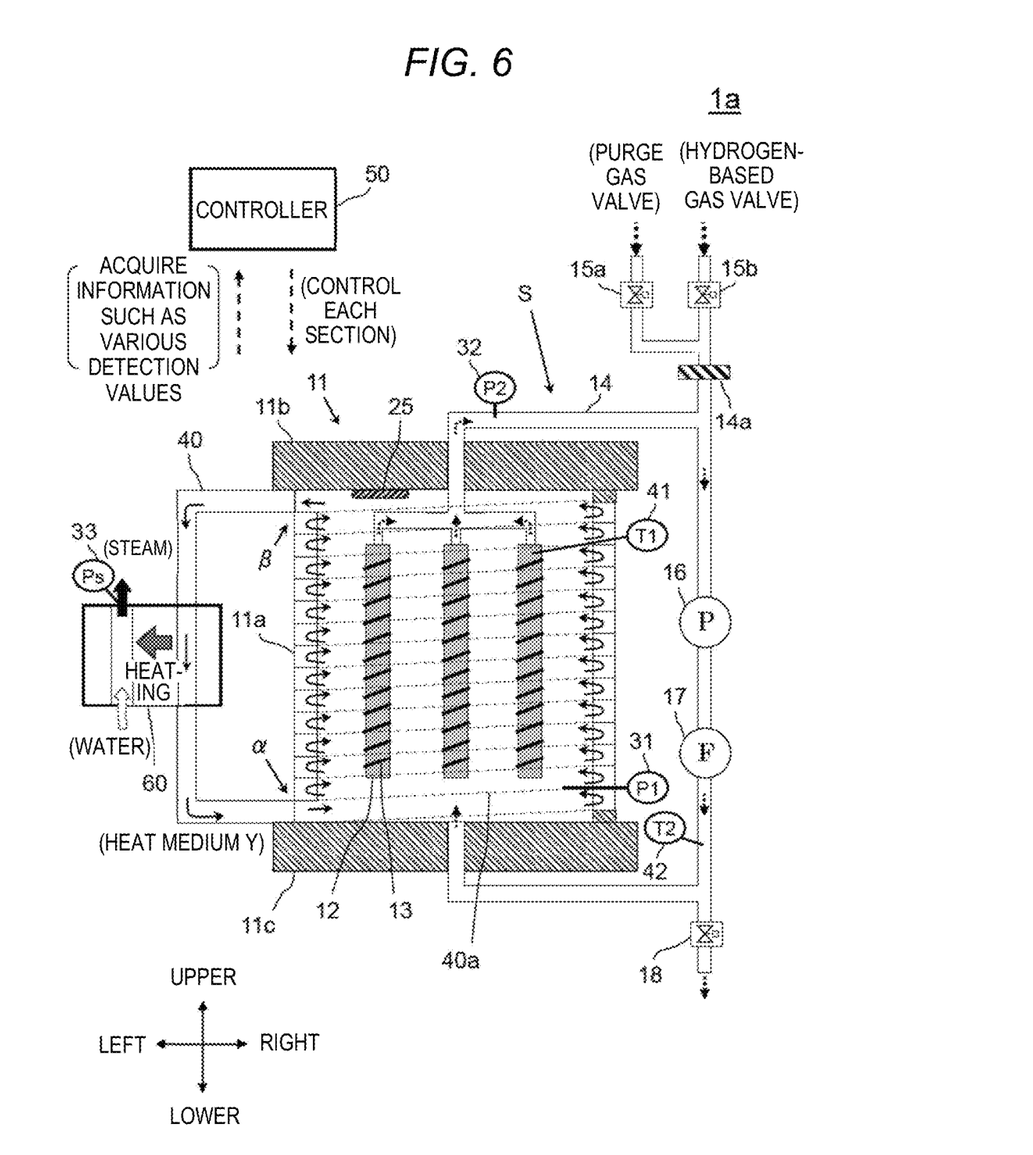
FIG. 6 is a schematic configuration diagram of a boiler 1a configured such that a heat medium flows in a heat medium path.

In a boiler 1a illustrated in FIG. 6, a heat medium path 40 is provided instead of the water path 22, and a heat exchanger 60 is provided instead of the separator 21. The heat exchanger 60 is configured such that part of the heat medium path 40 in which the heat medium Y flows is arranged in the heat exchanger 60, and receives water (a supply of water as the steam source) supplied from the outside. Note that the heat medium Y circulates in the heat medium path 40 including a heat transfer pipe 40a as indicated by solid arrows in FIG. 6. The configuration and arrangement form of the heat transfer pipe 40a are similar to those of the heat transfer pipe 22a of the first embodiment. With this configuration, the heat medium Y heated by reactants 12 (heat generation bodies) can be delivered to the heat exchanger 60, the supplied water can be heated by the heat medium Y to generate steam, and the steam can be supplied to the outside. Note that the heat exchanger 60 may be configured to generate hot water instead of generating steam by heating water.

For example, a plate or shell-and-tube heat exchanger may be employed as the heat exchanger 60, or various forms of steam generators may be employed. As one example of these steam generators, there is one having a storage space for storing supplied water and a tubular body arranged in the storage space and allowing passage of a heat medium and configured to transmit heat of the heat medium to the stored water through the tubular body. In the boiler 1a illustrated in FIG. 6, a separator pressure sensor 30 may be provided in the heat exchanger 60, and the controller 50 may control a heat generation amount of the heat generation body as in the case of the first embodiment based on a steam pressure (a pressure Ps) detected in the heat exchanger 60.

The boiler 1a is configured such that the heat exchanger 60 is provided on the heat medium path 40. Instead of the heat medium path 40 including the heat transfer pipe 22a, the side wall 11a which is not the heat transfer pipe 22a is provided and the heat exchanger 60 is provided on the circulation path S so that water supplied to the heat exchanger 60 can be heated to generate vapor. A schematic configuration diagram of a boiler 1b configured as described above is illustrated as an example in FIG. 7. Note that description will be made focusing on contents different from those of the boiler 1a, and description of common contents might be omitted.

Figure 7:
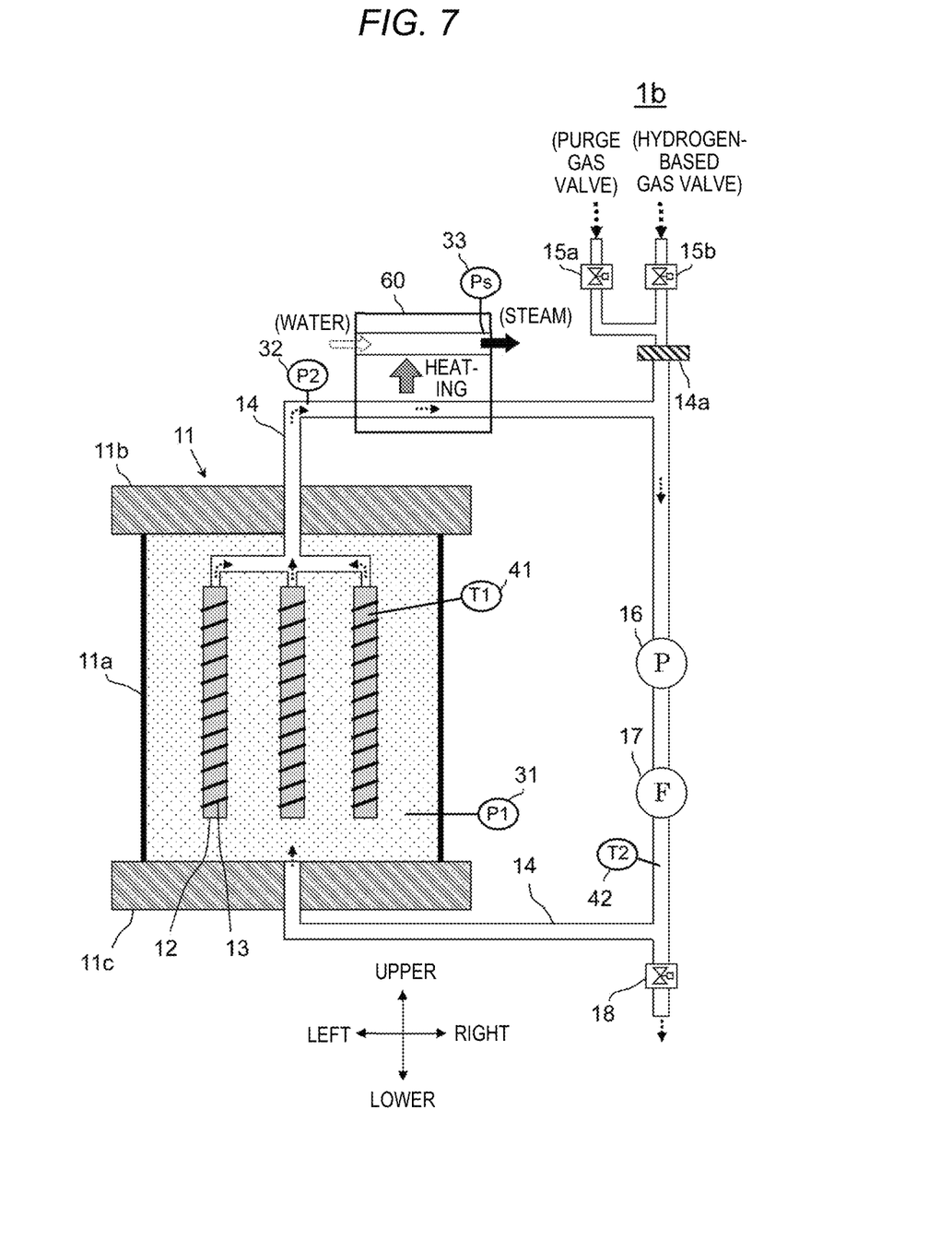
FIG. 7 is a schematic configuration diagram of a boiler 1b including a heat exchanger outside.

In the boiler 1b illustrated in FIG. 7, the cylindrical side wall 11a is provided at the side of the container 11, the upper side of the side wall 11a is closed by the upper bottom portion 11b, and the lower side of the side wall 11a is closed by the lower bottom portion 11c. Note that in the boiler 1b, the side wall 11a of the container 11 is in the cylindrical shape as an example, but may be formed in other tubular shapes. Alternatively, the can body cover may be placed at the outer periphery of the side wall 11a, and the heat insulating member may be provided between the side wall 11a and the can body cover.

Part of the gas path 14 is arranged in the heat exchanger 60, and water as a vapor source is supplied to the heat exchanger 60. With this configuration, the heat exchanger 60 exchanges heat between gas in the gas path 14 and the supplied water to heat the water so that vapor can be generated and can be supplied to the outside of the boiler 1b. Note that the heat exchanger 60 of the present embodiment has specifications that the heat exchanger 60 heats water to generate vapor, but a heat exchanger having specifications that the heat exchanger heats water to generate hot water may be employed instead.

In the boiler 1b, the amount of vapor supplied from the heat exchanger 60 to the outside may be adjustable based on information on a detection value of a heat exchanger pressure sensor 33 configured to detect the pressure (a vapor pressure) of the vapor supplied to the outside. Under a situation where the amount of vapor supplied from the heat exchanger 60 is greater than a vapor amount (a vapor load) required from the outside, the detection value (the value of the vapor pressure) of the heat exchanger pressure sensor 33 is high. Conversely, under a situation where the amount of vapor supplied from the heat exchanger 60 is smaller, the detection value of the heat exchanger pressure sensor 33 is low. Thus, the boiler 1b can be achieved in such a manner that a vapor generation amount is increased by an increase in the heat generation amount of the reactant 12 when the detection value of the heat exchanger pressure sensor 33 is smaller than a proper value and is decreased by a decrease in the heat generation amount of the reactant 12 when the detection value of the heat exchanger pressure sensor 33 is greater than the proper value.

Note that the heat generation amount of the reactant 12 can be controlled by adjustment of the temperature of the heater 13 or the gas circulation amount as described above, and can be increased as the temperature of the heater 13 increases or the circulation amount increases. Moreover, in the heat exchanger 60, water is sequentially supplied by the amount of vapor supplied to the outside, i.e., by the water decrement, and vapor can be continuously generated and supplied to the outside.

In the boilers 1a, 1b, an operation start process (the steps S1 to S9) and an operation stop process (the steps S21 to S24) similar to those of the first embodiment can be also executed.

The embodiments of the present invention have been described above, but the configuration of the present invention is not limited to those of the above-described embodiments. Various changes can be made without departing from the gist of the invention. That is, the above-described embodiments are examples on all points, and should be considered as non-limitative. For example, the boiler according to the present invention is also applicable to a hot water boiler, a heat medium boiler or the like in addition to the boiler configured to generate steam as in the above-described embodiments. The technical scope of the present invention is not determined by description of the above-described embodiments, but is determined by the claims. It should be understood that meaning equivalent to that of the claims and all changes pertaining to the claims are included.

The present invention can be utilized for boilers for various purposes.

What is claimed is:

1. A boiler comprising:
   a heat generation body;
   a container configured such that the heat generation body is provided inside and configured to be chargeable during a charging process with hydrogen-based gas with higher specific heat than that of air;
   a circulation path located in an inside of the container for providing a path for gas circulation;
   a device including a vacuum pump configured to perform gas discharging from the circulation path during the charging process; and
   a controller configured to perform the following tasks:
   a. before safely operating a normal operation of the boiler, supplying a predetermined purge gas into the circulation path until a first predetermined condition is reached;
   b. after reaching the first predetermined condition of the purge gas in the circulation path, supplying a predetermined hydrogen-based gas during a charge process into the circulation path while discharging the purge gas during a discharge process at the same time;
   c. during the task b, monitoring in the circulation path a predetermined combination of a circulation amount and a concentration of a mixture of the hydrogen-based gas and the purge gas during the charge process and the discharge process to provide monitored values; and
   d. upon reaching a second predetermined condition based upon the monitored values, stopping the charge process and the discharge process while starting to heat the boiler for the normal operation of the boiler.

2. The boiler according to claim 1, wherein
the controller monitors the circulation amount based on a pressure difference between a downstream side and an upstream side of the heat generation body on the circulation path or a gas flowmeter provided on the circulation path.

3. The boiler according to claim 1, wherein
the heat generation body is a reactant configured such that
   a metal nanoparticle made of hydrogen storing metals is provided on a surface of the reactant, and
   the metal nanoparticle stores a hydrogen atom to generate excess heat.

4. The boiler according to claim 1, wherein the controller controls, after execution of the charging process, a heat generation amount of the heat generation body based on a pressure of steam supplied to an outside.

5. The boiler according to claim 1, wherein the controller monitors the circulation amount based on a pressure difference between a downstream side and an upstream side of the heat generation body on the circulation path or a gas flowmeter provided on the circulation path.

6. A method of controlling a boiler, comprising the steps of:
   a. before safely operating a normal operation of the boiler, supplying a predetermined purge gas into a circulation path until a first predetermined condition is reached;
   b. after reaching the first predetermined condition of the purge gas in the circulation path, supplying a predetermined hydrogen-based gas during a charge process into the circulation path while discharging the purge gas using a vacuum pump during a discharge process at the same time;

c. during the step b, monitoring in the circulation path a predetermined combination of a circulation amount and a concentration of a mixture of the hydrogen-based gas and the purge gas during the charge process and the discharge process to provide monitored values; and d. upon reaching a second predetermined condition based upon the monitored values, stopping the charge process and the discharge process while starting to heat the boiler for the normal operation of the boiler.

7. A method of controlling a boiler, comprising the steps of:

a. before safely operating a normal operation of the boiler, supplying a predetermined purge gas into a circulation path until a first predetermined condition is reached;

b. after reaching the first predetermined condition of the purge gas in the circulation path, start heating the boiler to a predetermined safe temperature and supplying a predetermined hydrogen-based gas during a charge process into the circulation path while discharging the purge gas using a vacuum pump during a discharge process at the same time;

c. during the step b, monitoring in the circulation path a predetermined combination of a circulation amount and a concentration of a mixture of the hydrogen-based gas and the purge gas during the charge process and the discharge process to provide monitored values; and d. upon reaching a second predetermined condition based upon the monitored values, stopping the charge process and the discharge process while starting to heat the boiler beyond the predetermined safe temperature for the normal operation of the boiler.

* * * * *